US010200882B1

(12) United States Patent
Nelapati et al.

(10) Patent No.: US 10,200,882 B1
(45) Date of Patent: Feb. 5, 2019

(54) BEAMFORMING BASED ON LOCALIZATION MODULE INFORMATION

(71) Applicant: GM GLOBAL TECHNOLOGY OPERATIONS LLC, Detroit, MI (US)

(72) Inventors: Praneeth Nelapati, Novi, MI (US); Curtis L. Hay, West Bloomfield, MI (US); Steven R. Croyle, Bingham Farms, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/715,576

(22) Filed: Sep. 26, 2017

(51) Int. Cl.
| | |
|---|---|
| *H04W 16/28* | (2009.01) |
| *G01S 3/48* | (2006.01) |
| *H01Q 3/34* | (2006.01) |
| *H04W 4/04* | (2009.01) |
| *H04W 76/10* | (2018.01) |
| *G01C 21/36* | (2006.01) |
| *G01S 19/13* | (2010.01) |

(52) U.S. Cl.
CPC ............... *H04W 16/28* (2013.01); *G01S 3/48* (2013.01); *H01Q 3/34* (2013.01); *H04W 4/046* (2013.01); *H04W 76/10* (2018.02); *G01C 21/36* (2013.01); *G01S 19/13* (2013.01)

(58) Field of Classification Search
CPC ..... H04B 17/104; H04W 76/10; H04W 16/28
USPC .......................................... 455/456.1, 456.3
See application file for complete search history.

(56) References Cited

U.S. PATENT DOCUMENTS

| | | | |
|---|---|---|---|
| 2012/0139791 A1* | 6/2012 | Edelhaeusser | .......... G01S 5/021 |
| | | | 342/451 |
| 2018/0077595 A1* | 3/2018 | Park | ........................ H04W 8/02 |

* cited by examiner

*Primary Examiner* — Chuck Huynh (57) ABSTRACT

A system including: a memory configured to include one or more executable instructions, a controller configured to execute the executable instructions, a vehicle including a vehicle system and an antenna system, the vehicle system configured to generate vehicle location data, the antenna system configured to implement the beamforming tactics based on received angle of arrival information so as to create a directed communication link with one or more transceiving devices, a localization data module configured to produce angle of arrival information for one or more select locations; and where the executable instructions enable the controller to: receive vehicle location data communicated from the vehicle; based on the vehicle location data, perform the localization data module to produce angle of arrival information for the one or more select locations; communicate the angle of arrival information for each of the one or more select locations to the vehicle system.

17 Claims, 7 Drawing Sheets

BEAMFORMING BASED ON LOCALIZATION MODULE INFORMATION

INTRODUCTION

With the advent of remote wireless communication abilities being incorporated into mobile computing devices (e.g., vehicle telematics units and cell phones), wireless communication is quickly becoming a public necessity. Highways are, for example, getting littered with an increasing number of cellular base stations. As such, when a vehicle enters into the vicinity of one of these base stations, information can be exchanged between the base station and the vehicle's telematics unit. Consequently, regardless of the increasing number of base stations, the vast number of connectable vehicles using cellular network resources has created a drain on the networks which has resulted in a reduction of bandwidth and range for these base stations.

In an effort to strengthen the cellular network through increased range and bandwidth, cellular base stations have been employing beamforming processes to connect with numerous client vehicles along their stretch of the highway. As such, the base station can communicate with each of these vehicles without interference from any other client communications. Beamforming itself presents its own set of issues, however, one of which being that the antenna system of the vehicle has to generally know the precise direction of a base station before communications can be established.

Existing vehicle systems employ processes that rely on instantaneous directing of the antenna system signals to connect with nearby cellular base stations. For example, a vehicle's telematics unit may upload real-time GPS data of nearby base station locations to determine the direction of the nearest base station and subsequently direct the vehicle's antenna system based upon that GPS data. That said, uploading information in this manner presumes that real-time GPS data is accessible and acquirable at the exact time it is needed. If this data is not accessible and/or acquirable, the telematics unit is forced to rely on other preprogrammed processes, if any, to find nearby base stations. Moreover, even when acquired, if the GPS data is slightly inaccurate, errors in the beamforming processes can happen and create problems with establishing communications between the vehicle's antenna system and the nearby base station.

In light of the above shortcomings, it would be desirable to utilize a system which can predict the vehicle's locations in relation to a base station before the vehicle enters its broadcasting range and attempts to connect. In addition, this prediction information can be used to prepare the vehicle's antenna system to be directed towards the base station before the vehicle enters the station's broadcasting range. Utilizing such a system can allow the antenna system to respond faster when switching communications from one base station to the next as well as reduce latency issues when making such a switch. Moreover, the antenna system can be directed towards the base station's location even if real-time GPS data is not attainable and/or accessible at the precise time of connection. Accordingly, the system and method disclosed herein provides these capabilities as well as others.

SUMMARY

A system of one or more computing devices can be configured to perform particular operations or actions by virtue of having software, firmware, hardware, or a combination of them installed on the system that in operation causes or cause the system to perform the actions. One or more executable instructions can be configured to perform particular operations or actions by virtue of including instructions that, when executed by a controller cause the apparatus to perform the actions.

One general aspect includes a system to produce Angle of Arrival information for the implementation of beamforming tactics, the system including: a memory configured to include one or more executable instructions. The system also includes a controller configured to execute the executable instructions. The system also includes a vehicle including a vehicle system and an antenna system. The system also includes the vehicle system configured to generate vehicle location data, the vehicle system further configured to communicate the vehicle location data to the controller, the vehicle system further configured to receive angle of arrival information from the controller. The system also includes the antenna system configured to implement the beamforming tactics based on received angle of arrival information so as to create a directed communication link with one or more transceiving devices. The system also includes a localization data module configured to produce angle of arrival information for one or more select locations; and where the executable instructions enable the controller to: receive vehicle location data communicated from the vehicle; based on the vehicle location data, perform the localization data module to produce angle of arrival information for the one or more select locations; communicate the angle of arrival information for each of the one or more select locations to the vehicle system. Other embodiments of this aspect include corresponding computing devices, apparatus, and executable instructions recorded on one or more memory devices, each configured to perform the actions of the systems.

Implementations may include one or more of the following features. The system where the vehicle system includes a GPS module to generate the vehicle location data. The system where the transceiving device is a cellular base station. The system where the memory and controller are located at a data center. The system where the localization data module is located at a remote computing device. The system where: the localization data module includes: a mapping engine configured to produce map data; a search engine configured to produce geographical features to support the generation of the map data; and performance of the localization data module includes: provide a map request to mapping engine, the map request including the vehicle location data; permit the mapping engine to produce the map data; permit the search engine to produce geographical features for the map data; construct a localization map based on the map data and geographical features, the localization map including coordinates corresponding to the one or more transceiving devices; calculate the select locations where the vehicle should adequately enter into the broadcast range for each of the one or more transceiving devices in the localization map; based on the coordinates corresponding to the one or more transceiving devices, calculate the angle of arrival for each of the select locations; and produce the angle of arrival for each of the select locations. The system where: the antenna system includes: a phase controller to generate line of sight information based on the angle of arrival information; an antenna module coupled to a plurality of antennas and the phase controller, the antenna module configured to vary the relative phases of one or more communication output signals configured to be communicated to the plurality of antennas, the relative phases being based on the line of sight information; the plurality of antennas configured to establish the directed communication link with the one or more transceiving devices based on the relative phases; and where the angle of arrival information enables the antenna system to: generate, via the phase controller, line of sight information based on received angle of arrival information; vary, via the antenna module, the relative phases of one or more communication output signals based on the line of sight information from the phase controller; establish, via the plurality of antennas, the directed communication link with the one or more transceiving devices based on the relative phases. Implementations of the described techniques may include hardware, a method or process, or executable instructions on a non-transitory and machine-readable medium.

One general aspect includes a method to produce Angle of Arrival information for the implementation of beamforming tactics, the method including: providing a memory configured to include one or more executable instructions. The method also includes providing a controller configured to execute the executable instructions. The method also includes providing a vehicle including a vehicle system and an antenna system. The method also includes where the vehicle system is configured to generate vehicle location data, where the vehicle system is further configured to communicate the vehicle location data to the controller, where the vehicle system is further configured to receive angle of arrival information from the controller. The method also includes where the antenna system is configured to implement the beamforming tactics based on received angle of arrival information so as to create a directed communication link with one or more transceiving devices. The method also includes providing a localization data module configured to produce angle of arrival information for one or more select locations. The method also includes receiving, via the controller, vehicle location data communicated from the vehicle. The method also includes based on the vehicle location data, performing, via the controller, the localization data module to produce angle of arrival information for the one or more select locations. The method also includes communicating, via the controller, the angle of arrival information for each of the one or more select locations to the vehicle system. Other embodiments of this aspect include corresponding computing devices, apparatus, and executable instructions recorded on one or more memory devices, each configured to perform the actions of the systems Implementations may include one or more of the following features. The method further including implementing beamforming tactics based on received angle of arrival information, via the antenna system, to create a directed communication link with the one or more transceiving devices at one or more select locations. The method where the vehicle system including a GPS module to generate the vehicle location data. The method where the transceiving device is a cellular base station. The method where the memory and controller are located at a data center. The method where the localization data module is located at a remote computing device. The method where: the localization data module includes: a mapping engine configured to produce map data. The method may also include a search engine configured to produce geographical features to support the generation of the map data; and where the step of performing the localization data module further includes: providing, via the localization data module, a map request to mapping engine, the map request including the vehicle location data; permitting, via the localization data module, the mapping engine to produce the map data; permitting, via the localization data module, the search engine to produce geographical features for the map data; constructing, via the localization data module, a localization map based on the map data and geographical features, the localization map including coordinates corresponding to the one or more transceiving devices; calculating, via the localization data module, the select locations where the vehicle should adequately enter into the broadcast range for each of the one or more transceiving devices in the localization map; based on the coordinates corresponding to the one or more transceiving devices, calculating, via the localization data module, the angle of arrival for each of the select locations; and producing, via the localization data module, the angle of arrival for each of the select locations.

The method where: the antenna system includes: a phase controller to generate line of sight information based on the angle of arrival information; an antenna module coupled to a plurality of antennas and the phase controller, the antenna module configured to vary the relative phases of one or more communication output signals configured to be communicated to the plurality of antennas, the relative phases being based on the line of sight information; the plurality of antennas configured to establish the directed communication link with the one or more transceiving devices based on the relative phases; generating, via the phase controller, line of sight information based on received angle of arrival information; varying, via the antenna module, the relative phases of one or more communication output signals based on the line of sight information from the phase controller; establishing, via the plurality of antennas, the directed communication link with the one or more transceiving devices based on the relative phases. Implementations of the described techniques may include hardware, a method or process, or executable instructions on a non-transitory and machine-readable medium.

One general aspect includes a non-transitory and machine-readable medium having stored thereon executable instructions adapted to produce angle of arrival information, which when provided to a controller and executed thereby, causes the controller to: receive vehicle location data communicated from a vehicle system configured to generate vehicle location data; produce angle of arrival information for one or more select locations; and communicate the angle of arrival information for each of the one or more select locations to the vehicle system, where the angle of arrival information is in a suitable format to support an antenna system to implement beamforming tactics so as to create a directed communication link with one or more transceiving devices. Other embodiments of this aspect include corresponding computing devices, apparatus, and executable instructions recorded on one or more memory devices, each configured to perform the actions of the systems.

Implementations may include one or more of the following features. The non-transitory and machine-readable medium where the vehicle system including a GPS module to generate the vehicle location data. The non-transitory and machine-readable medium where the transceiving device is a cellular base station. The non-transitory and machine-readable medium where when the executable instructions are provided to a controller and executed thereby, further causes the controller to: provide a map request to a mapping engine, the map request including the vehicle location data; permit the mapping engine to produce map data; permit the search engine to produce geographical features for the map data; construct a localization map based on the map data and geographical features, the localization map including coordinates corresponding to the one or more transceiving devices; calculate the select locations where the vehicle should adequately enter into the broadcast range for each of the one or more transceiving devices in the localization map; based on the coordinates corresponding to the one or more transceiving devices, calculate the angle of arrival for each of the select locations; and produce the angle of arrival for each of the select locations. The medium may also include a transceiving device located at each of the one or more select locations. The non-transitory and machine-readable medium where: the antenna system includes: a phase controller to generate line of sight information based on the angle of arrival information; an antenna module coupled to a plurality of antennas and the phase controller, the antenna module configured to vary the relative phases of one or more communication output signals configured to be communicated to the plurality of antennas, the relative phases being based on the line of sight information; and the plurality of antennas configured to establish the directed communication link with the one or more transceiving devices based on the relative phases. Implementations of the described techniques may include hardware, a method or process, or executable instructions on a non-transitory and machine-readable medium.

The above features and advantages and other features and advantages of the present teachings are readily apparent from the following detailed description for carrying out the teachings when taken in connection with the accompanying drawings.

BRIEF DESCRIPTION OF THE DRAWINGS

The disclosed examples will hereinafter be described in conjunction with the following drawing figures, wherein like numerals denote like elements, and wherein.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present system and/or method. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
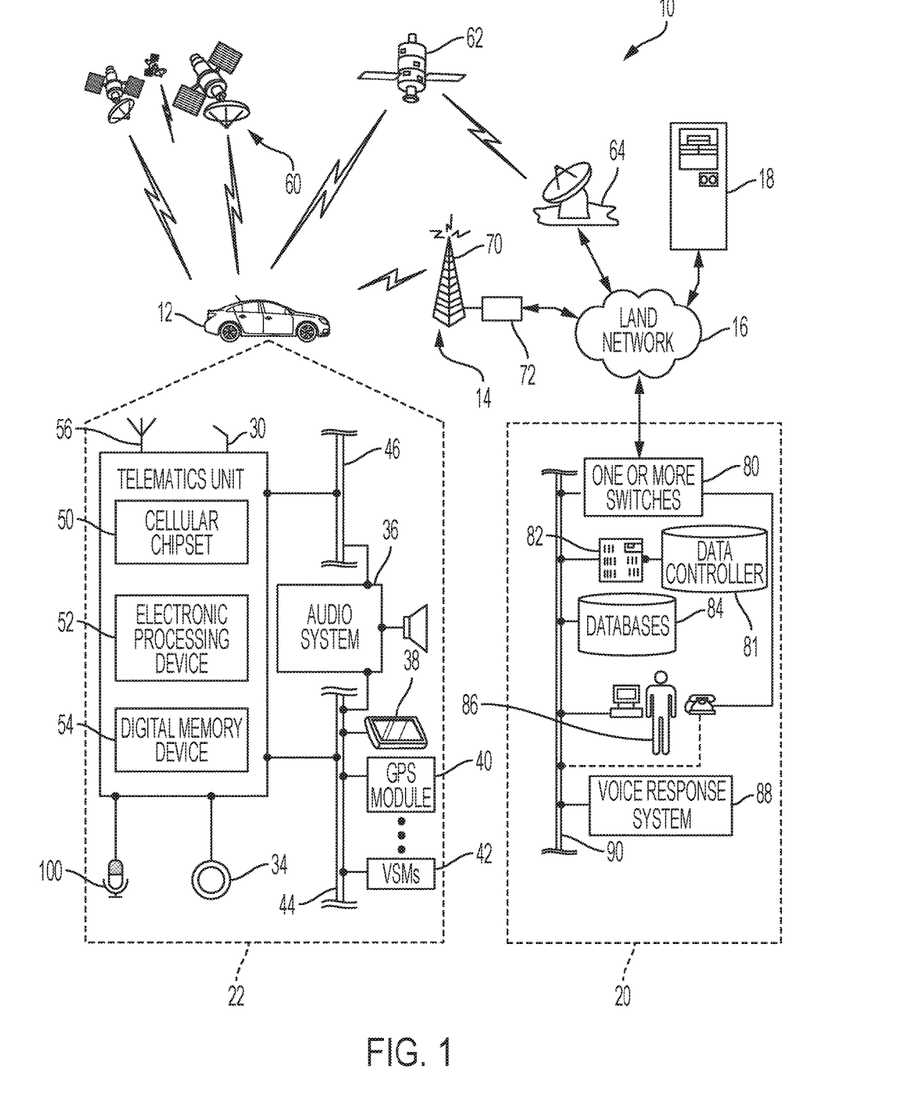
FIG. 1 is a block diagram depicting an exemplary embodiment of a communications system that is capable of utilizing the system and method disclosed herein.

With reference to FIG. 1, there is shown an operating environment that includes, among other features, a mobile vehicle communications system 10 and that can be used to implement the method disclosed herein. Communications system 10 generally includes a vehicle 12, one or more wireless carrier systems 14, a land communications network 16, a remote computing device 18, and a data center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including, but not limited to, motorcycles, trucks, busses, sports utility vehicles (SUVs), recreational vehicles (RVs), construction vehicles (e.g., bulldozers), trains, trolleys, marine vessels (e.g., boats), aircraft, helicopters, amusement park vehicles, farm equipment, golf carts, trams, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit 30 such as, for example, the microphone 32 and pushbutton(s) 34, whereas others are indirectly connected using one or more network connections, such as a communications bus 44 or an entertainment bus 46. Examples of suitable network connections include a controller area network (CAN), WIFI, Bluetooth and Bluetooth Low Energy, a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket transceiver device that is installed in the vehicle and that enables wireless voice and/or data communication over wireless carrier system 14 and via wireless networking. This enables the vehicle to communicate with data center 20, other telematics-enabled vehicles, or some other entity or device. The telematics unit 30 preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor 86 or voice response unit at the data center 20) and data communication (e.g., to provide GPS location data or vehicle diagnostic data to the data center 20), the system can utilize a single call over a voice channel and switch as needed between voice and data transmission over the voice channel, and this can be done using techniques known to those skilled in the art.

According to one embodiment, telematics unit 30 utilizes cellular communication according to standards such as LTE or 5G and thus includes a standard cellular chipset 50 for voice communications like hands-free calling, a wireless modem for data transmission (i.e., transceiver), an electronic processing device 52, at least one digital memory device 54, and an antenna system 70. It should be appreciated that the modem can either be implemented through software that is stored in the telematics unit and is executed by processor 52, or it can be a separate hardware component located internal or external to telematics unit 30. The modem can operate using any number of different standards or protocols such as, but not limited to, WCDMA, LTE, and 5G. The antenna system 56 can operate by transmitting output signals to a receiver (e.g., a base station) either by transmitting in all directions or by performing beamforming. Transmission of the output signals is mainly in the radio frequency (RF) range although transmission at other frequencies is also possible.

Wireless networking between vehicle 12 and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Telematics Controller 52 (processor) can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Telematics Controller 52 executes various types of digitally-stored instructions, such as software or firmware programs stored in memory 54, which enable the telematics unit to provide a wide variety of services. For instance, controller 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services provided in connection with one or more vehicle system modules 42 (VSM); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit 30 is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 62 of GPS satellites (shown as one). From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to data center 20 or other remote computer system, such as remote computing device 18, for other purposes, such as fleet management. Also, new or updated map data can be downloaded to the GPS module 40 from the data center 20 via the telematics unit 30.

Apart from the audio system 36 and GPS module 40, the vehicle 12 can include other VSMs 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests.

As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art.

The pushbutton(s) 34 allow manual user input into the telematics unit 30 to initiate wireless telephone calls and provide other data, response, or control input. Separate pushbuttons can be used for initiating emergency calls versus regular service assistance calls to the data center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM, media streaming services (e.g., PANDORA RADIO™, SPOTIFY™, etc.), satellite radio, CD, DVD, and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions (i.e., capable of GUI implementation). Audio system 36 may also generate at least one audio notification to announce such third-party contact information is being exhibited on display 38 and/or may generate an audio notification which independently announces the third-party contact information. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more cellular base stations 72, as well as any other networking components required to connect wireless carrier system 14 with land network 16. Each cell tower 70 includes sending and receiving antennas and a base station, with the base stations from different cell towers being connected to the base station 72 either directly or via intermediary equipment such as a base station controller. Cellular system 14 can implement any suitable communications technology, including for example, analog technologies such as AMPS, or the newer digital technologies such as, but not limited to, 4G LTE and 5G. As will be appreciated by skilled artisans, various cell tower/base station/CNI arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to data center 20. For example, land network 16 may include a public switched telephone network (PSTN) such as that used to provide hardwired telephony, packet-switched data communications, and the Internet infrastructure (i.e., a network of interconnected computing device nodes). One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, data center 20 need not be connected via land network 16, but could include wireless telephony equipment so that it can communicate directly with a wireless network, such as wireless carrier system 14.

Remote computing device 18 can be one of a number of computers accessible via a private or public network such as the Internet. Each such computer 18 can be used for one or more purposes, such as a web server accessible by the backend server 82, vehicle via telematics unit 30, and wireless carrier 14. Other such accessible remote computing devices 18 can be, for example: a localization data module server to implement a localization data module to produce Angle of Arrival information (discussed below); a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or data center 20, or both. A remote computing device 18 can also be used for providing Internet connectivity such as DNS services or as a network address server that uses DHCP or other suitable protocol to assign an IP address to the vehicle 12.

Data center 20 is designed to provide the vehicle electronics 28 with a number of different system backend functions and, according to the exemplary embodiment shown here, generally includes one or more switches 80, servers 82, databases 84, live advisors 86, as well as an automated voice response system (VRS) 88, all of which are known in the art. These various data center components are preferably coupled to one another via a wired or wireless local area network 90. Switch 80, which can be a private branch exchange (PBX) switch, routes incoming signals so that voice transmissions are usually sent to either the live adviser 86 by regular phone, backend computer 87, or to the automated voice response system 88 using VoIP. Server 82 can incorporate a data controller 81 which essentially controls the operations of server 82. Server 82 may control data information as well as act as a transceiver to send and/or receive the data information (i.e., data transmissions) from one or more of the databases 84, telematics unit 30, and mobile computing device 57.

Controller 81 is capable of reading executable instructions stored in a non-transitory machine readable medium and may include one or more from among a processor, a microprocessor, a central processing unit (CPU), a graphics processor, Application Specific Integrated Circuits (ASICs), Field-Programmable Gate Arrays (FPGAs), state machines, and a combination of hardware, software and firmware components. The live advisor phone can also use VoIP as indicated by the broken line in FIG. 1. VoIP and other data communication through the switch 80 is implemented via a modem (i.e., a transceiver), connected between the land communications network 16 and local area network 90.

Data transmissions are passed via the modem to server 82 and/or database 84. Database 84 can store account information such as vehicle dynamics information and other pertinent subscriber information. Data transmissions may also be conducted by wireless systems, such as 802.11x, GPRS, and the like. Although the illustrated embodiment has been described as it would be used in conjunction with a manned data center 20 using live advisor 86, it will be appreciated that the data center can instead utilize VRS 88 as an automated advisor or, a combination of VRS 88 and the live advisor 86 can be used.

Beamforming

Beamforming is a signal processing technique used to control directionality/sensitivity of a radiation pattern. Through the performance of beamforming techniques, the antenna system 56 can increase the gain in the direction in which an output signal is to be transmitted by adjusting the phase of the transmitted signals to focus energy in a specified direction (discussed below). The transmission direction of the output signal is specified based on the location of the transceiving device (e.g., base station 72) in relation to the wireless antenna system 56. Accordingly, direction of signal transmission depends on the position (and possibly the orientation) of the antenna system 56 (i.e., the vehicle). Angle of Arrival information can be calculated by a localization data module 78 and subsequently exchanged between localization data module 78 and telematics unit 30. Telematics unit 30 then provides the Angle of Arrival information to antenna system 56 to be used to specify the direction of the beamformed signals. The antenna system 56 can then identify and transmit in the direction of the transceiving device. Furthermore, the position of vehicle 12 can also be determined by localization data module 78 (as supported by information from GPS module 40) to allow antenna system 56 to sequentially communicate with a number of transceiving devices as the vehicle moves along a path from one location to another.

Antenna System

Figure 2:
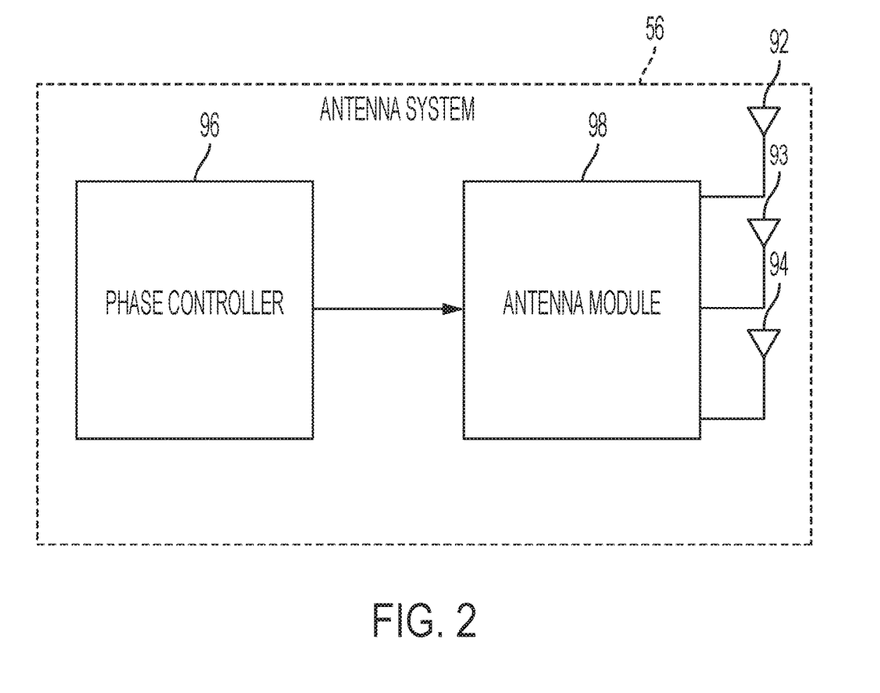
FIG. 2 is a block diagram depicting an exemplary antenna system according to an embodiment.

Referring now to FIG. 2, an exemplary antenna system 56 is shown in detail to include a plurality of antennas 92-94, a phase controller 96, and an antenna module 98 coupled to the antennas 92-94 and phase controller 96. The phase controller 96 controls beamforming by controlling the amplitude and phase of the of the output signal at each transmitting antenna so as to create a pattern of constructive and destructive interference therein. Generally, phase controller 96 works as an optimizer which converges to a beamforming solution when the constraints are set properly. Phase controller 96 moreover determines amplitude and phase of the output signals based on the calculated Angle of Arrival information provided from telematics unit 30. This amplitude and phase information is subsequently transferred from phase controller 96 to the antenna module 98, to be considered as predictive Line of Sight information. The antenna module 98 varies the relative phases of the output signals being fed to the antennas 92-94 such that the effective radiation pattern of the output signal is reinforced in a specific direction. As such, the antennas 92-94 may be directed to focus the transmission power in the direction of communication. In one embodiment, beamforming by antenna system 56 provides 12 dB of transmission power while beamforming by the base station 72 provides an additional 12 dB. In furtherance, 10 dB of transmission power may be available for outdoor communication through such systems as WIMAX. Thus, more than 30 dB of transmission power could be provided by antenna system 56 to allow for long-range broadband communication between vehicle 12 and the base station 72. It should be understood that other exemplary embodiments of antenna system 56 may be used to implement beamforming tactics. It should also be understood that telematics unit 30 may calculate predictive Line of Sight information.

Localization Data Module

Figure 3:
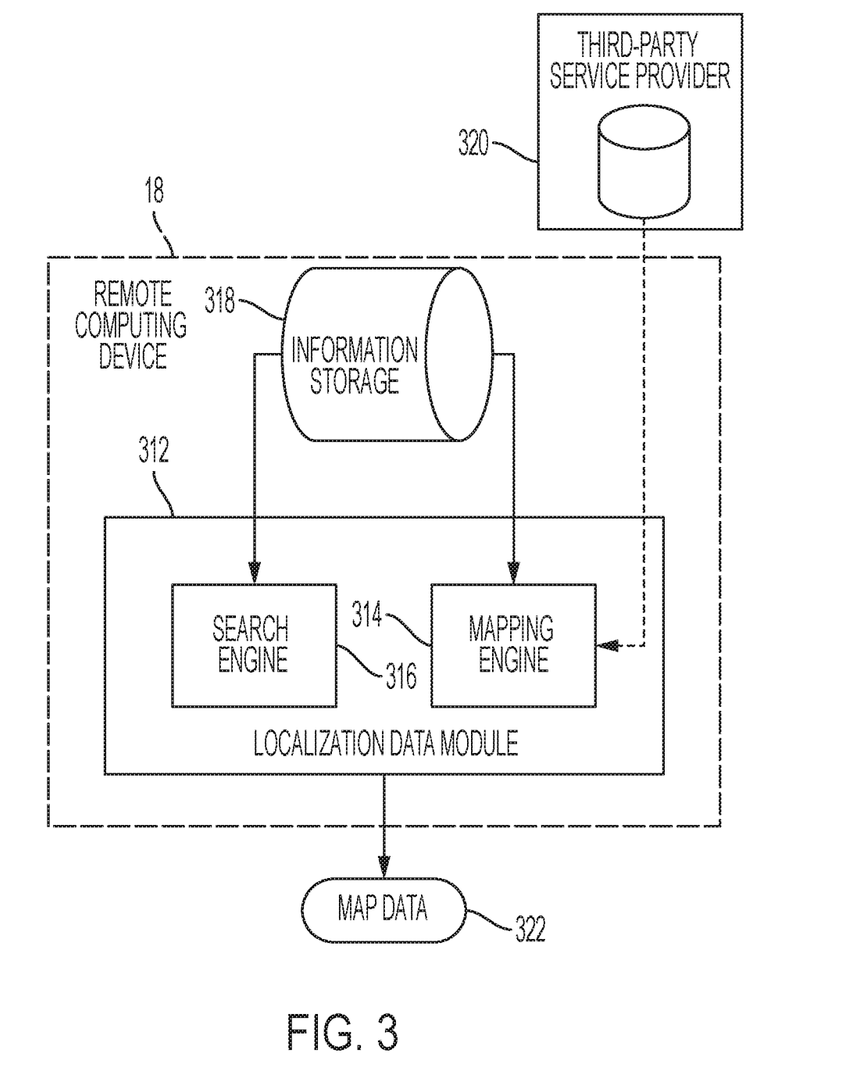
FIG. 3 is a schematic representation of an exemplary localization data module according to an aspect of the system and method presented herein.

FIG. 3 is a block diagram schematically showing a detailed exemplary embodiment of module server 18 as including certain functional blocks, which do not necessarily correspond to any physical separation of the functions. Rather, these blocks correspond to software modules (segments of executable instructions). Localization data module 312 may be performed to identify a specific location, as discussed above. It should be understood that module server 310 may be backend server 82 or remote computing device 18. When module server 310 is embodied as backend server 82, remote computing device 18 may be considered a third-party service provider. It should be understood that other exemplary embodiments of module server 18, and its exemplary functions, may be implemented without deviating from the scope of the present system and method discussed herein.

Localization data module 312 includes two distinct components—a mapping engine 314 and search engine 316. Mapping engine 314 receives and serves map requests from and on behalf of data center server 54. For example, in response to a request to provide a map of given GPS coordinates, mapping engine 314 retrieves the required information from information storage 318, and then filters and formats the map data in suitable form for provision to data center server 54. Conversely, search engine 316 receives and serves requests from the data center server 54 to locate a certain geographical features for the map such as, but not limited to, mountains, buildings, trees, and other geographical features. Module server 310 may correspondingly use data from a third-party service provider 320 to support production of a map data output 322. For example, search engine 314 may access a third-party wireless carrier system database in order to determine geocodes (map coordinates) of currently active cellular base stations. Moreover, third-party service provider 320 may include one or more dynamic content providers. Localization data module 312 may generate map data in the form of text labels. The output of data module 312 may be compressed into a binary form, to minimize the bandwidth consumed by transmission of the data from module server 312 to data center server 54. This transmitted data may further be encrypted for purposes of data security.

The map data 322 may be arranged in layers, each layer corresponding to a different type of map feature, as is generally known. The layers define the shapes and locations of the features and can include textual labels. One or more of these layers may additionally include dynamic data, such as, for example, traffic conditions. In those embodiments of which the map data 322 includes a visualization aspect (e.g., to be exhibited via a vehicle display), module server 18 holds multiple templates for each layer, and can download the appropriate templates to data center server 54. Skilled artisans will also see that the collection of templates used to render multiple layers on a given client device may be treated as a single multi-template. Since the same templates are used in displaying maps of different geographical areas, data center server 54 may store the templates in databases 56, so that the templates need be downloaded only once to display multiple different maps.

Figure 4:
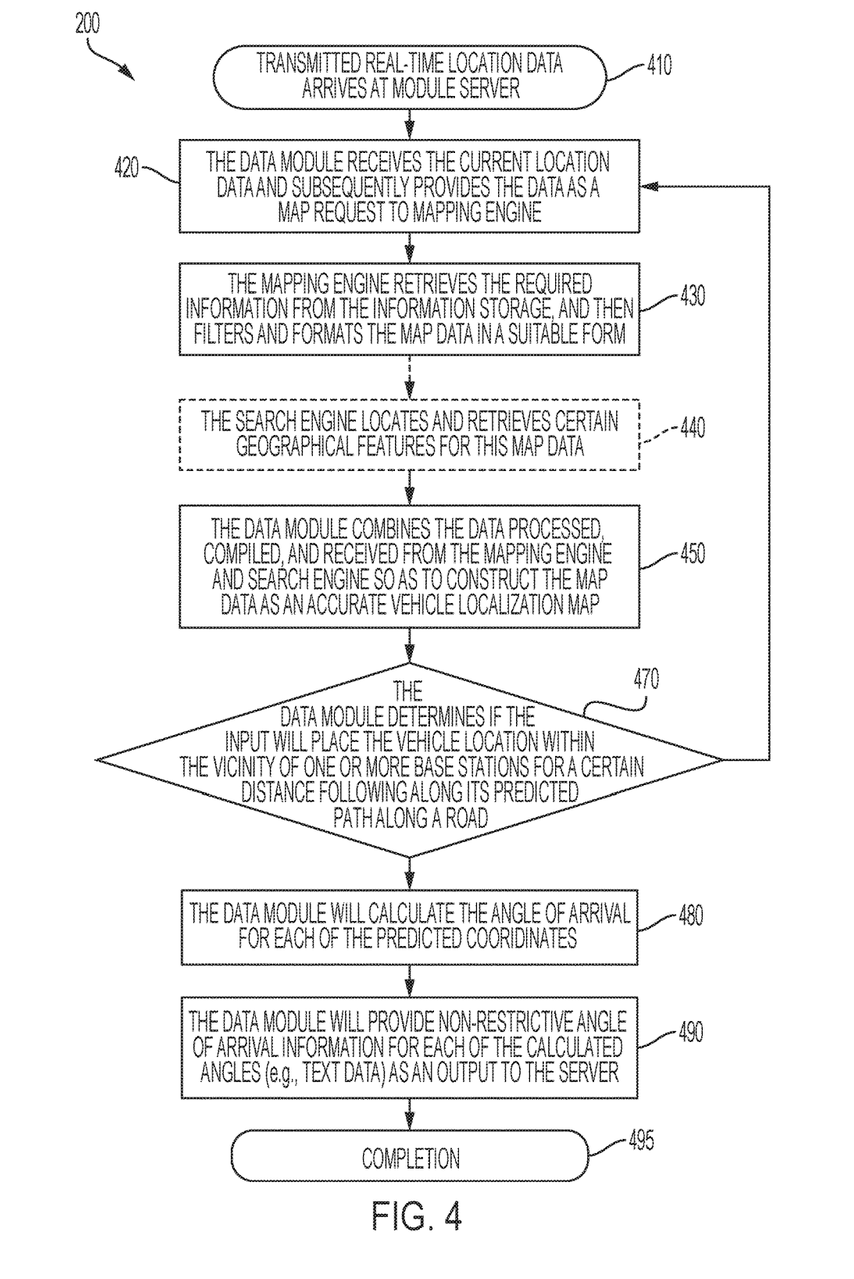
FIG. 4 is an exemplary system flow for utilization of the localization data module of FIG. 3.
Figure 5:
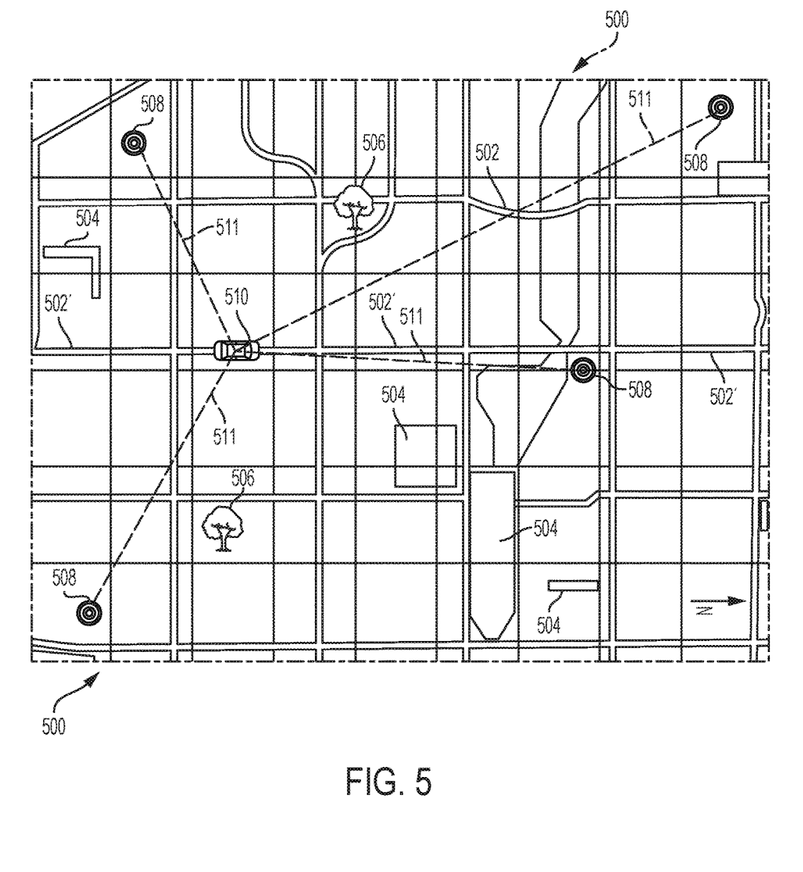
FIG. 5 represents an exemplary map illustrating a performance of the localization data module of FIG. 3.

FIG. 4, and with further reference to FIG. 5, shows an exemplary schematic representation of an exemplary embodiment of a system flow for the discussed above localization data module 312. As illustrated in FIG. 4, system flow 400 starts with transmitted real-time location data 410 arriving at module server 312; this location data includes tracked, demodulated GPS coordinates that have been generated from GPS module 40. In step 420, data module 312 receives the current location data and subsequently provides the data as a map request to mapping engine 314. Mapping engine 314 retrieves the required information from information storage 318, and then filters and formats the map data in a suitable form, in step 430. In step 440, search engine 316 locates and retrieves certain geographical features for this map data. Search engine 316 may additionally correspond with a third-party service provider 320 to receive more accurate map data (e.g., dynamic data) and subsequently compile and analyze this third party data, optionally in step 440. In step 450, data module 312 combines the data processed, compiled, and received from mapping engine 314 and search engine 316 to construct the map data as an accurate vehicle localization map 500. Moreover, as illustrated, the map 500 produced from localization data module 312 includes relative/absolute positional references for distinct localization features such as, but not limited to, road 502, buildings 504, foliage 506, and cellular base stations 508.

Upon completion of localization map 500, in step 470, data module 312 determines if the input will place the vehicle location 510 within the vicinity of one or more base stations 508 for a certain distance following along its predicted path along road 502' (e.g., 10 miles). Data module 312 may moreover calculate the predicted locations (i.e., relative/absolute positional references) where the vehicle will adequately enter into the broadcast range of such base stations 508 (i.e., the approximate location where the broadcast signal would first be received by antenna system 56). This calculation may be implemented through known mathematical techniques that utilize the combined predicted vehicle location 510 and predicted road orientation (based on the road shape/geography of a predicted future location) with reference to the estimated location and broadcast range of the future base station 508. If the vehicle location 510 reflects that vehicle 12 will enter into the range of at least one down-the-road base station 508, then data module 312 will store the predicted coordinates (i.e., relative/absolute positional references) for each location the vehicle will move into the range of a new base station 308 in a proper data format (binary code format) within the information storage 318. System flow 400 will also move to step 480. Otherwise, when the vehicle not in the calculable vicinity of any base stations 508, system flow 400 will return to step 420 where the system flow 400 will remain until updated location data has been received.

In step 480, data module 312 will calculate the Angle of Arrival for each of the predicted coordinates. The Angle of Arrival may be calculated using standard mathematical techniques generally known to skilled artisans and which utilize the predicted coordinates and vehicle orientation (i.e., due to road direction amongst other factors) with reference to the location of the corresponding base station 508, for example. In step 490, data module 312 will provide non-restrictive Angle of Arrival information for each of the calculated angles (e.g., text data) as an output to server 82. After step 490, the system flow 400 ends and finalizes its operations 495.

Method

Figure 6:
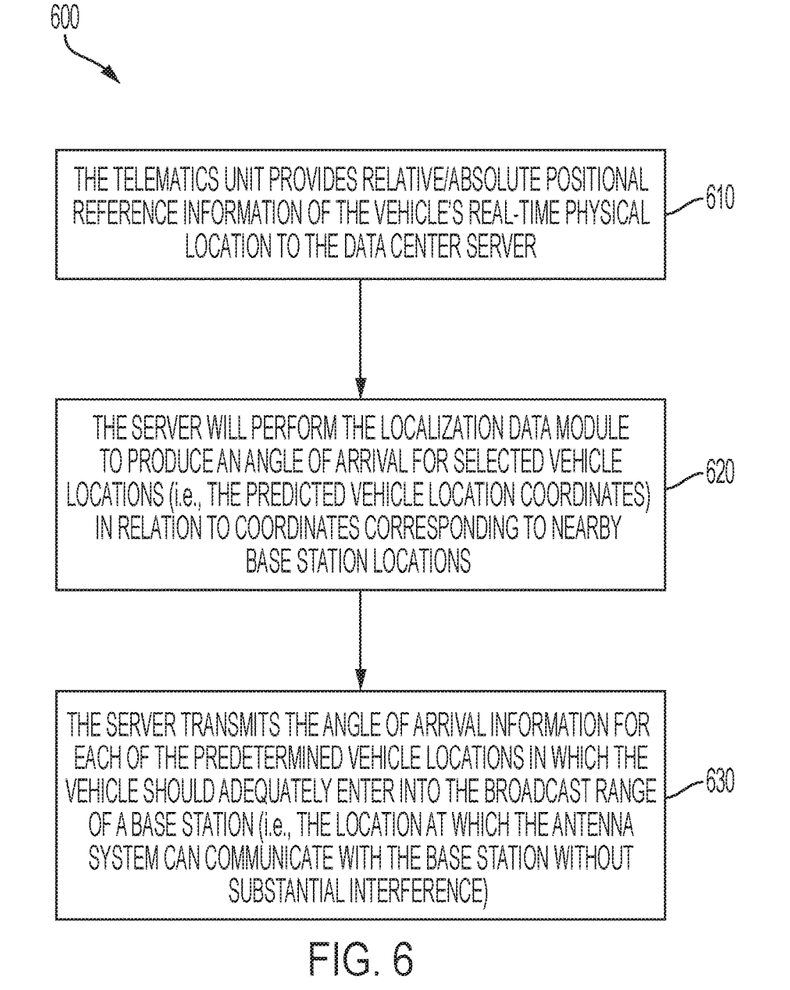
FIG. 6 is an exemplary system flow for a method of beamforming implementing localization data according to an embodiment.

Turning now to FIG. 6, there can be seen an application of an exemplary method 600 to establish a beamformed communication link between antenna system 56 and one or more base stations 72 based on one or more calculated a Angles of Arrival for predicted vehicle coordinates produced through a localization data module. Aspects of this method can be executed through the backend server 82, for example, implementing the functionality of data module 312 to produce Angle of Arrival information. Peripheral aspects may additionally be executed through telematics unit 30, for example, receiving the Angle of Arrival information and providing such information in a suitable form for antenna system 56. Other peripheral aspects may additionally be executed through antenna system 56, for example, generating predictive Line of Sight information from the Angle of Arrival information, so as to implement beamforming techniques to create the directed communication link with one or more base stations 72. Skilled artists will see that, in certain embodiments, telematics unit 30 may itself generate the Line of Sight information and provide it to antenna system 56.

In this method, telematics unit 30 is preconfigured to automatically transmit location data from GPS module 40 as well as receive Angle of Arrival information and other localization data from backend server 82. Backend server 82 is moreover preconfigured to communicate with localization data module to develop and generate Angle of Arrival information and providing such information in a suitable form to be received by telematics unit 30.

Method 600 begins with step 610, in which the telematics unit 30 provides relative/absolute positional reference information of the vehicle's real-time physical location to data center server 82. As such, GPS module 40 will receive GPS satellite signals from a constellation of satellites and subsequently generate GPS coordinates based on those signals, as discussed above.

In step 620, server 82 will perform the localization data module to produce an Angle of Arrival for selected vehicle locations (i.e., the predicted vehicle location coordinates) in relation to coordinates corresponding to nearby base station locations 72. This step may moreover consist of data module 312 permitting mapping engine 314 to produce map data and permitting search engine 316 to produce geographical features for the map data, as discussed above. This step may further consist of the data module 312 constructing a localization map, based on both the map data and geographical features, which includes coordinates corresponding to substantially all base station locations populated onto the localization map. This step may further consist of data module 312 calculating the select locations where the vehicle will adequately enter into the broadcast range for each of the base stations 72.

With reference back to FIG. 5, this step may consist of data module 312 calculating Angle of Arrival 511 for each of the vehicle locations based on the coordinates corresponding to the one or more base station locations 508. As discussed above, the Angle of Arrival 511 measurement is a method for determining the direction of propagation of a radio-frequency wave incident on antenna system 56. Putting this concept into perspective, as represented in FIG. 5, if vehicle location 510 is static while a base station location 508 is dynamically moved from one point to another within the generated localization map, the Angle of Arrival 511 would change over to each subsequent base station location 508. Thus, at a selected reference point, one version of the Angle of Arrival 511 may be directed to the Northwest for one base station location 508, while it may be directed to the Southeast for another base station 508 location. In step 630, as an output, server 82 transmits the Angle of Arrival information for each of the predetermined vehicle locations in which the vehicle should adequately enter into the broadcast range of a base station 72 (i.e., the location at which antenna system 56 can communicate with base station 72 without substantial interference).

Figure 7:
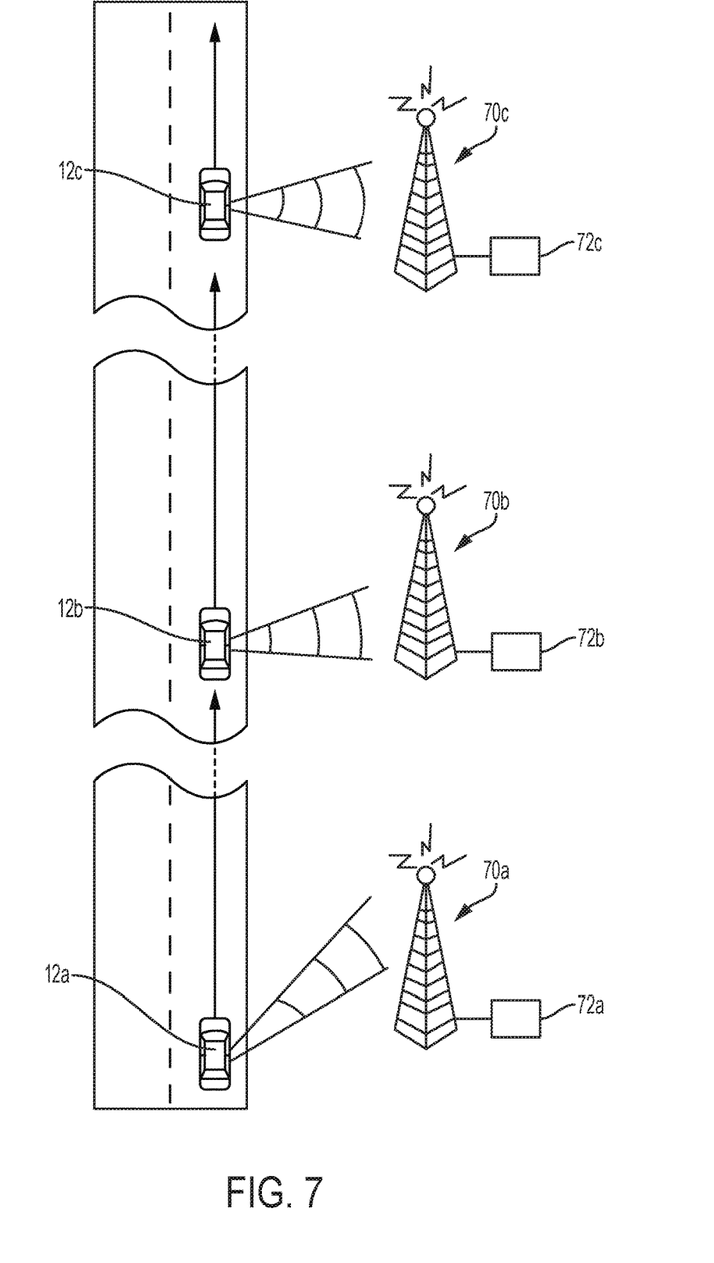
FIG. 7 represents the implementation of beamforming based on the localization data module output according to an embodiment.

As represented in FIG. 7, antenna system 56 can use the Angle of Arrival information to implement beamforming tactics to allow directed communications with each base station 72a-c, as the vehicle 12 reaches the broadcast range per each base station 72a-c. Consequently, prior to reaching each broadcasting range, telematics unit 30 will have stored the Angles of Arrival for each vehicle location. As a result, telematics unit 30 and/or antenna system 56 does not have to calculate the Angles of Arrival at the moment vehicle 12 enters the broadcasting range. This can increase connection speed/reduce latency issues when antenna system 56 is required to switch communication links from one base station 72 to the next (e.g., between base station 72a and base station 72b). In addition, if the GPS module 40, for one reason or another, fails to connect with GPS satellites and/or cannot compute the location of vehicle 12, the Angle of Arrival for that vehicle location will have already been stored in telematics unit 30. Thus, especially when implemented for substantial periods of time, the system presented herein acts as a safeguard against a GPS data loss event that would keep antenna system 56 from creating a communication link with the closest base station 72.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the system and/or method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

None of the elements recited in the claims are intended to be a means-plus-function element within the meaning of 35 U.S.C. § 112(f) unless an element is expressly recited using the phrase "means for".

What is claimed is:

1. A system to produce Angle of Arrival information for an implementation of beamforming tactics, the system comprising:
 a memory configured to comprise one or more executable instructions;
 a controller configured to execute the executable instructions;
 a vehicle comprising a vehicle system and an antenna system;
 the vehicle system configured to generate vehicle location data, the vehicle system further configured to communicate the vehicle location data to the controller, the vehicle system further configured to receive Angle of Arrival information from the controller;
 the antenna system configured to implement the beamforming tactics based on received Angle of Arrival information so as to create a directed communication link with one or more transceiving devices;
 a localization data module configured to produce Angle of Arrival information for one or more select locations, wherein the localization data module comprises:
  a mapping engine configured to produce map data;
  a search engine configured to produce geographical features to support the generation of the map data; and
  wherein performance of the localization data module includes:
   provide a map request to mapping engine, the map request comprising the vehicle location data;
   permit the mapping engine to produce the map data;
   permit the search engine to produce geographical features for the map data;

construct a localization map based on the map data and geographical features, the localization map comprising coordinates corresponding to the one or more transceiving devices;

calculate the select locations where the vehicle should adequately enter into a broadcast range for each of the one or more transceiving devices in the localization map;

based on the coordinates corresponding to the one or more transceiving devices, calculate the Angle of Arrival for each of the select locations; and produce the Angle of Arrival for each of the select locations; and wherein the executable instructions enable the controller to:

receive vehicle location data communicated from the vehicle;

based on the vehicle location data, perform the localization data module to produce Angle of Arrival information for the one or more select locations; and communicate the Angle of Arrival information for each of the one or more select locations to the vehicle system.

2. The system of claim 1, wherein the vehicle system comprising a GPS module to generate the vehicle location data.

3. The system of claim 1, wherein the transceiving device is a cellular base station.

4. The system of claim 1, wherein the memory and controller are located at a data center.

5. The system of claim 1, wherein the localization data module is located at a remote computing device.

6. The system of claim 1, wherein:

the antenna system comprising:

a phase controller to generate Line of Sight information based on the Angle of Arrival information;

an antenna module coupled to a plurality of antennas and the phase controller, the antenna module configured to vary the relative phases of one or more communication output signals configured to be communicated to the plurality of antennas, the relative phases being based on the Line of Sight information; and the plurality of antennas configured to establish the directed communication link with the one or more transceiving devices based on the relative phases; and wherein the Angle of Arrival information enables the antenna system to:

generate, via the phase controller, Line of Sight information based on received Angle of Arrival information;

vary, via the antenna module, the relative phases of one or more communication output signals based on the Line of Sight information from the phase controller; and establish, via the plurality of antennas, the directed communication link with the one or more transceiving devices based on the relative phases.

7. A method to produce Angle of Arrival information for an implementation of beamforming tactics, the method comprising:

providing a memory configured to comprise one or more executable instructions;

providing a controller configured to execute the executable instructions;

providing a vehicle comprising a vehicle system and an antenna system;

wherein the vehicle system is configured to generate vehicle location data, wherein the vehicle system is further configured to communicate the vehicle location data to the controller, wherein the vehicle system is further configured to receive Angle of Arrival information from the controller;

wherein the antenna system is configured to implement the beamforming tactics based on received Angle of Arrival information so as to create a directed communication link with one or more transceiving devices;

providing a localization data module configured to produce Angle of Arrival information for one or more select locations;

receiving, via the controller, vehicle location data communicated from the vehicle;

based on the vehicle location data, performing, via the controller, the localization data module to produce Angle of Arrival information for the one or more select locations;

communicating, via the controller, the Angle of Arrival information for each of the one or more select locations to the vehicle system; and wherein the localization data module comprises:

a mapping engine configured to produce map data;

a search engine configured to produce geographical features to support the generation of the map data; and wherein the step of performing the localization data module further comprising:

providing, via the localization data module, a map request to mapping engine, the map request comprising the vehicle location data;

permitting, via the localization data module, the mapping engine to produce the map data;

permitting, via the localization data module, the search engine to produce geographical features for the map data;

constructing, via the localization data module, a localization map based on the map data and geographical features, the localization map comprising coordinates corresponding to the one or more transceiving devices;

calculating, via the localization data module, the select locations where the vehicle should adequately enter into a broadcast range for each of the one or more transceiving devices in the localization map;

based on the coordinates corresponding to the one or more transceiving devices, calculating, via the localization data module, the Angle of Arrival for each of the select locations; and producing, via the localization data module, the Angle of Arrival for each of the select locations.

8. The method of claim 7, further comprising implementing beamforming tactics based on received Angle of Arrival information, via the antenna system, to create a directed communication link with the one or more transceiving devices at one or more select locations.

9. The method of claim 7, wherein the vehicle system comprising a GPS module to generate the vehicle location data.

10. The method of claim 7, wherein the transceiving device is a cellular base station.

11. The method of claim 7, wherein the memory and controller are located at a data center.

12. The method of claim 7, wherein the localization data module is located at a remote computing device.

13. The method of claim 7, wherein:
the antenna system comprising:
- a phase controller to generate Line of Sight information based on the Angle of Arrival information;
- an antenna module coupled to a plurality of antennas and the phase controller, the antenna module configured to vary the relative phases of one or more communication output signals configured to be communicated to the plurality of antennas, the relative phases being based on the Line of Sight information; and
- the plurality of antennas configured to establish the directed communication link with the one or more transceiving devices based on the relative phases;

generating, via the phase controller, Line of Sight information based on received Angle of Arrival information;

varying, via the antenna module, the relative phases of one or more communication output signals based on the Line of Sight information from the phase controller; and establishing, via the plurality of antennas, the directed communication link with the one or more transceiving devices based on the relative phases.

14. A non-transitory and machine-readable medium having stored thereon executable instructions adapted to produce Angle of Arrival information for an implementation of beamforming tactics, which when provided to a controller and executed thereby, causes the controller to:
- receive vehicle location data communicated from a vehicle system configured to generate vehicle location data;
- based on the vehicle location data, produce Angle of Arrival information for one or more select locations; and
- communicate the Angle of Arrival information for each of the one or more select locations to the vehicle system, wherein the Angle of Arrival information is in a suitable format to support an antenna system to implement beamforming tactics so as to create a directed communication link with one or more transceiving devices; and
- provide a map request to a mapping engine, the map request comprising the vehicle location data;
- permit the mapping engine to produce map data;
- permit the search engine to produce geographical features for the map data;
- construct a localization map based on the map data and geographical features, the localization map comprising coordinates corresponding to the one or more transceiving devices;
- calculate the select locations where the vehicle should adequately enter into a broadcast range for each of the one or more transceiving devices in the localization map;
- based on the coordinates corresponding to the one or more transceiving devices, calculate the Angle of Arrival for each of the select locations; and
- produce the Angle of Arrival for each of the select locations.

15. The non-transitory and machine-readable medium of claim 14, wherein the vehicle system comprising a GPS module to generate the vehicle location data.

16. The non-transitory and machine-readable medium of claim 14, wherein the transceiving device is a cellular base station.

17. The non-transitory and machine-readable medium of claim 14, wherein:
the antenna system comprising:
- a phase controller to generate Line of Sight information based on the Angle of Arrival information;
- an antenna module coupled to a plurality of antennas and the phase controller, the antenna module configured to vary the relative phases of one or more communication output signals configured to be communicated to the plurality of antennas, the relative phases being based on the Line of Sight information; and
- the plurality of antennas configured to establish the directed communication link with the one or more transceiving devices based on the relative phases.

* * * * *